Patented Aug. 27, 1395

2,012,789

UNITED STATES PATENT OFFICE 2,012,789

PURIFIED VIRUS AND PROCESS OF PURIFYING IT

Henry R. Kraybill, Pearl H. Brewer, and Max W. Gardner, West Lafayette, Ind., assignors to Purdue Research Foundation, West Lafayette, Ind., a corporation of Indiana No Drawing. Application March 26, 1932, Serial No. 601,450

10 Claims. (Cl. 167—78)

It is the object of our invention to separate and purify virus preparations generally, both of plant and animal viruses, which exhibit a negative charge when in an acid medium.

It is a further object of our invention to obtain such viruses substantially free from extraneous organic matter, such as cell tissue, and with sufficient potency to make them effectively available for use.

Virus preparations produced by methods heretofore known contain large amounts of extraneous materials, which were extracted along with the virus from the plant or animal host or from the detached tissues and products which serve as the source of the virus. Such extraneous matter may modify the action of the true virus, and may itself produce unwanted effects.

Considerable work has been done in recent years in attempts to purify viruses. While some purification has been obtained, usually if not always it has been at the cost of a great loss in potency.

We have discovered that it is possible to obtain from the host tissues, of plant and animal, suspensions which contain the virus practically free from extraneous organic matter.

According to our invention, we first obtain in the form of a solution or suspension a material containing a negatively charged virus, with the virus exposed. It has already been shown that many viruses, and probably all viruses, are negatively charged. If the virus is intra-cellular, the obtaining of this solution or suspension with the virus exposed involves breaking down the virus-containing cells, as by grinding in a colloid mill and/or digesting with suitable enzymes, such as diastases and/or proteolytic enzymes; to obtain the virus and/or its carrier in a colloidal or quasi-colloidal condition.

The solution or suspension containing the exposed virus is then treated to cause a coagulation or flocculation of organic matter co-present with the virus, while leaving the virus or much of it in the solution. That is, the treatment is such that a greater percentage of such co-present organic matter than of the virus is caused to coagulate or flocculate, and thus to precipitate; so that a greater percentage of the virus than of the organic matter remains in the solution. It would be desirable, of course, to coagulate or flocculate all the co-present organic matter and none of the virus; and while in some instances we may approach that fairly closely, in others the approach to it is not so close, but in all cases we are able to obtain in this way a marked purification of the virus which remains in the solution.

The treatment to obtain this flocculation or coagulation embodies one or both of the following:

1. The hydrogen ion concentration of the solution or suspension which contains the virus and co-present organic matter is adjusted to the neighborhood of the iso-electric point of the co-present organic matter, but away from any iso-electric point of the virus. The isoelectric point of such co-present organic matter is for the most part between pH 4 and pH 6.5; while the isoelectric point of viruses generally, when they have an isoelectric point, is apparently outside of that range and usually in the neighborhood of pH 2 to pH 3.

2. A reagent is added to the solution or suspension to assist in this flocculation or coagulation of the co-present organic matter. Such reagent has one or more of the following characteristics:

*a*. It is a protein-precipitating reagent.

*b*. It tends to cause flocculation or coagulation of a greater percentage of the co-present organic matter than of the virus.

*c*. It carries a negative electric charge; so that it tends to repel the negatively charged virus, but to attract the positively charged co-present organic matter.

*d*. It has a large surface in proportion to its volume. That is, the ratio of its surface to its volume is in the neighborhood of that of quasi-colloids. To this end, it may itself be in colloidal or quasi-colloidal condition, although sometimes it may be more in the nature of a sponge which has a large surface compared to its actual volume.

The treating reagent thus used is preferably a special negatively charged aluminum gel, added to the solution under an acid hydrogen ion concentration; but it may be various other things, such for instance as a form of charcoal which carries a negative charge, or a negatively charged form of kaolin or fuller's earth, such for instance as the well-known Lloyd's reagent.

After this treatment of the solution or suspension containing the exposed virus, to produce the coagulum or flocculum which is relatively rich in the co-present organic matter and poor in the virus in comparison with the solution, such flocculum or coagulum is separated from the solution, as by filtration or decantation; and the solution, which is relatively rich in the virus, is preserved.

In this way we are able to get highly potent purified virus preparations which are substantially water-clear; and which have a total-solids content and an organic-matter content and a nitrogen content not exceeding 10% of those of the original unpurified virus, or virus-containing material derived from the host, and usually not exceeding 5% thereof, and in some instances as low as 1.0% to 1.5% thereof.

The negatively charged aluminum gel which we use as our preferred reagent is a special acid form of aluminum gel, made in the following manner:

Two liters of a 25% solution of aluminum sulphate $Al_2(SO_4)_3$, are prepared by dissolving the aluminum sulphate in distilled water. This solution is divided into two equal parts—of one liter each. Dilute ammonium hydroxide is added to one part until the solution is alkaline to litmus— or until complete precipitation occurs and a slight odor of ammonia remains. Then the other part of the original aluminum-sulphate solution is added to the part which was made alkaline, and the combined material is thoroughly mixed. The mixture is allowed to stand and settle in a warm room for twenty-four hours, by which time a white gelatinous precipitate has formed and settled to the bottom of the container. The supernatant liquid is removed, as by decanting or siphoning. Distilled water is added to the remaining precipitate, to restore the original volume; and the whole is stirred or shaken, and again allowed to settle in a warm room for about twenty-four hours, when the clear supernatant liquid is again removed as before. This cycle of adding distilled water to the gelatinous precipitate, shaking or stirring, settling, and decanting is repeated until the ammonium salts are practically all removed, at which time the hydrogen ion concentration of the creamy precipitate remaining reaches a substantially constant value, which is usually between pH 4.4 and pH 5.0. Thus this aluminum gel has a definitely acid reaction, instead of the alkaline or nearly neutral reaction of the ordinary aluminum gel.

This acid-reaction creamy precipitate or aluminum gel contains negatively charged particles, and is the preferred negatively charged aluminum gel which we use in our process. Such negatively charged aluminum gel was invented by two of us, (Brewer and Kraybill), and forms the subject-matter of their Patent No. 1,942,799, granted January 9, 1934.

The form of charcoal which we may use is one which is specially treated to give it the negative charge. In such treatment, the charcoal may be prepared by charring suitable material in any convenient way, and then activating the charcoal in known ways to increase its power of adsorption and desirably to increase the ratio of its exposed surface to its actual volume; and then the charcoal is washed in acid to remove any bases that may be present and to render the charcoal acid or neutral.

The negatively charged kaolin or fuller's earth already has a negative charge when in the form of Lloyd's reagent. To get this negative charge, the kaolin or fuller's earth is carefully washed with acid, after having any material adsorbed upon it driven off in a suitable manner, and then is desirably washed with water to remove most or all of the adhering acid.

Our invention is applicable generally to plant and animal virus preparations which have negative charges; for, as has already been stated, it is known that many if not all viruses carry such negative charges. We give below one example of our invention as applied to a plant-virus preparation, and one example as applied to an animal-virus preparation.

The virus chosen for illustrating plant-virus preparations is the virus of typical tomato mosaic. The virus chosen for illustrating animal-virus preparations is the virus of hog cholera.

*Preparation of purified virus of typical tomato mosaic*

Tomato plants known to be affected with typical tomato mosaic (type A of Fernow or tobacco virus 1 of Johnson) are gathered and immediately ground to a fine pulp, with some breaking up of the cells and of the chloroplasts. The juice or sap is expressed from the pulpy mass by a suitable press. The liquid obtained from the press is passed several times at successively decreasing rates, through a supercentrifuge, such as a Sharples supercentrifuge, of which the bowl rotates at a very high speed, of the order of 35,000 R. P. M. For instance, the rate of liquid passage through the centrifuge for three passages may be successively 12, 6, and 3 liters per hour. In these three passages of the liquid through the centrifuge, the greater part of the suspended matter in the juice is deposited as a gummy deposit in the bowl of the supercentrifuge. This gummy deposit contains most of the virus.

This gummy deposit is mechanically removed from the walls of the supercentrifuge bowl, and enough distilled water is added to it in a suitable container to bring it to a thin paste. The container used is desirably glass. Then distilled water is added to the paste and the whole agitated for about half an hour, to get a suspension. For best results this making of the suspension is done with small quantities of the paste separately. This suspension is desirably ground in a colloid mill, for further breaking up of its solids and a very effective breaking up of the remaining cells and of the chloroplasts and an effective dispersion of the colloidal particles. The suspension thus obtained is again passed several times through the supercentrifuge, conveniently at the same rates and speed as before.

The liquid from the supercentrifuge in this second series of passages therethrough contains much of the virus, and is usually yellow and cloudy. It is highly infectious when inoculated into healthy tomato plants.

The yield may be increased by again suspending in water the solid gummy deposit caught on the supercentrifuge bowl, grinding again in a colloid mill if desired, and again supercentrifuging and saving the centrifugate and adding it to the first centrifugate; but this is usually not done.

The centrifugate following colloidal grinding is now further purified by adding to it a suspension of the aluminum gel prepared as above outlined so that it has an acid reaction. The aluminum gel is added in small quantities, with constant stirring, until flocculation or coagulation appears. This usually requires about 50 cc. of the aluminum gel for each liter of the virus suspension. The hydrogen ion concentration is desirably maintained between pH 4 and pH 6.5 during this flocculation or coagulation; but ordinarily this requires no additional reagent, because both the centrifugate and the aluminum gel usually exhibit acid reactions. The flocculum or coagulum thus produced contains most of the extraneous matter, possibly by an adsorption action, while the virus remains mainly in the liquid. The whole mixture is then filtered through fine filter paper. The resultant filtrate is usually water-clear, and is highly infectious.

We have found that with either the liquid from the centrifuging following colloidal grinding, or with the final preparation purified with aluminum gel, diluted to the volume of the original juice, we can obtain the same percentage of infection as with the original juice.

By this process of purifying, the final liquid obtained by purifying with aluminum gel is always found to contain less than 10% of the total solids, and of the organic matter, and of the nitrogen, of the original expressed juice or sap, usually below 5% thereof, and quite frequently as low as 1.0% thereof.

Instead of using aluminum gel, we may use negatively charged charcoal or negatively charged kaolin in exactly the same general manner.

Further, we can get good results by merely controlling the hydrogen ion concentration to maintain it between pH 4.0 and pH 6.5, as by adding hydrochloric or acetic acid, to produce a flocculation or coagulation which is rich in co-present organic matter and poor in the virus as compared to the solution; but we get better results by using a flocculating or coagulating reagent other than the acid, and still better by using both such reagent and a controlled hydrogen ion concentration together.

The following table shows a series of actual results obtained in the purifying of the virus of typical tomato mosaic:

| | Total solids percent | Ash percent | Nitrogen percent | Organic matter percent |
|---|---|---|---|---|
| Original juice | | | | |
| Sample No. 1 | 4.32 | 1.62 | 0.195 | 3.38 |
| Sample No. 2 | 5.19 | 1.81 | 0.240 | 2.70 |
| Purified Virus | | | | |
| Purified by aluminum gel | 0.078 | 0.037 | 0.00231 | 0.041 |
| Purified by negatively charged charcoal | 0.074 | 0.050 | 0.00101 | 0.024 |

Substantially the same process may be used for obtaining purified and concentrated viruses of other plant diseases, such for instance, as the viruses of:

*a*. Tomato plants infected with type B of Fernow or "Healthy" potato virus;
*b*. Jimson weed mosaic;
*c*. Tomato plants infected with streak;
*d*. "Curly Top" disease of beets;
*e*. Tobacco plants infected with Johnson tobacco virus 1.

*Preparation of purified virus of hog cholera*

Blood is obtained from hogs having cholera, and is promptly defibrinated in any usual or desired way. The defibrinated blood is diluted in physiological salt solution, 1 to 10.

Negatively charged aluminum gel, prepared as above outlined, is added to the diluted defibrinated blood, with constant stirring, until maximum flocculation occurs. To get maximum flocculation, a hydrogen ion concentration of between pH 4 and pH 6.5 is desirable; but the addition of the aluminum gel is ordinarily sufficient to produce this.

The material is then treated to separate the solid matter from the liquid. To this end, conveniently, the material is passed several times through a supercentrifuge, at successively decreasing rates of passage, with the supercentrifuge bowl rotating at a high speed, as of the order of 35,000 R. P. M. The rates for three successive passages through the supercentrifuge may be 6, 3, and 3 liters per hour. The liquid from the supercentrifuge is usually water-clear, and is sometimes fairly colorless although at other times it has a red color due to the presence of some hemoglobin.

The liquid thus obtained contains the hog-cholera virus, and is highly infectious. We have found that when this liquid and the original defibrinated blood are diluted to the same volume we obtain the same percentage of infection. In addition, it contains less than 15% of the total solids, the organic matter, and the nitrogen, and usually not more than 10% of the total solids, 5% of the organic matter, and 5% of the nitrogen, of the defibrinated hog blood.

Instead of using aluminum gel to purify the hog-cholera virus, we may, just as in the case of plant viruses, use other negatively charged reagents, such for instance as negatively charged charcoal or negatively charged kaolin; and we prefer to use them under controlled hydrogen ion concentration, to maintain the hydrogen ion concentration between pH 4.0 and pH 6.5; or we may use the controlled hydrogen ion concentration alone or the negatively charged reagents alone, although for best results we prefer to use them together.

This purified hog-cholera virus may be used for any purpose that unpurified hog-cholera virus is used. Indeed, it may be used much more freely because of the substantial absence of side reactions, such as those frequently encountered with the ordinary unpurified virus heretofore available.

This same general process of purifying animal viruses may be applied to the viruses of other animal diseases; such, for instance, as:

*a*. Vaccine virus, as covered specifically in a co-pending application of Charles A. Behrens, Serial No. 554,597, filed August 1, 1931;
*b*. Fixed-rabies virus;
*c*. Poliomyelitis;
*d*. Chicken-tumor virus;
*e*. Fowl-pox virus.

In the case of those viruses where virus is within the cells, the blood or other tissue may be passed through a colloid mill before the addition of the negatively charged aluminum gel, in order to break down the cells and expose the intra-cellular virus. This is not necessary in the case of hog-cholera virus or vaccine virus.

Instead of using a colloid mill to break down the cells where virus is intra-cellular, such cells may be broken down in other ways whenever that is necessary either for plant or animal viruses; as by digestion with enzymes, such as diastases and/or proteolytic enzymes, or by subjecting the cell-containing material to high gaseous pressure and then suddenly releasing that pressure to cause bursting of the cells in the manner set forth in the Larson Patent No. 1,517,845 of December 2, 1924.

The purified virus preparations above described, whether of plant virus or animal virus, may be used in the ordinary manner of virus preparations, for the same purposes that other plant-virus preparations and animal-virus preparations may be used; and may be used much more freely by reason of the absence of side reactions from normally co-present organic matter. The animal virus preparations may be used for the making of various anti-serums. While no plant-virus preparation has so far been successfully used for making an anti-substance, the purified plant-virus preparations of the various plant diseases are of great value in the study of and fight against those diseases, and are also of such great value in the study of animal diseases and their control that the great institutions devoted to such study have established divisions devoted to plant viruses for the information obtainable therefrom regarding viruses in general.

We claim as our invention:

1. The process of purifying a virus which exhibits a negative charge when in an acid medium, comprising adding acid or alkali if and as required to adjust the hydrogen ion concentration of a solution or suspension containing an exposed virus and co-present organic matter to the neighborhood of the isoelectric point of such co-present organic matter but away from the isoelectric point of the virus, to cause precipitation of a greater percentage of such co-present organic matter than of the virus and to leave in solution a greater percentage of the virus than of the co-present organic matter, and separating the virus-containing solution from the precipitate and preserving it.

2. The process of purifying a virus which exhibits a negative charge when in an acid medium, comprising adding acid or alkali if and as required to adjust the hydrogen ion concentration of a solution or suspension containing an exposed virus and co-present organic matter to between pH 4 and pH 6.5, to cause precipitation of a greater percentage of such co-present organic matter than of the virus and to leave in solution a greater percentage of the virus than of the co-present organic matter, and separating the virus-containing solution from the precipitate and preserving it.

3. The process of purifying a virus which exhibits a negative charge when in an acid medium, comprising treating a solution or suspension containing an exposed virus and co-present organic matter with a protein-precipitating reagent of the class consisting of negatively charged aluminum gel, negatively charged charcoal, and negatively charged kaolins which causes a coagulation or flocculation of a greater percentage of such organic matter than of the virus and leaves a greater percentage of the virus than of the organic matter in the solution, and separating the virus-containing liquid from the flocculum or coagulum and preserving it.

4. The process of purifying a virus which exhibits a negative charge when in an acid medium, comprising treating a solution or suspension containing an exposed virus and co-present organic matter with a protein-precipitating reagent of the class consisting of negatively charged aluminum gel, negatively charged charcoal, and negatively charged kaolins which causes a coagulation or flocculation of a greater percentage of such organic matter than of the virus and leaves a greater percentage of the virus than of the organic matter in the solution, adding acid if and as required to maintain the hydrogen ion concentration of the solution or suspension in the neighborhood of the isoelectric point of such co-present organic matter but away from the isoelectric point of the virus during such treatment, and separating the virus-containing liquid from the flocculum or coagulum and preserving it.

5. The process of purifying a virus which exhibits a negative charge when in an acid medium, comprising treating a solution or suspension containing an exposed virus and co-present organic matter with a protein-precipitating reagent of the class consisting of negatively charged aluminum gel, negatively charged charcoal, and negatively charged kaolins which causes a coagulation or flocculation of a greater percentage of such organic matter than of the virus and leaves a greater percentage of the virus than of the organic matter in the solution, adding acid if and as required to maintain the hydrogen ion concentration of the solution or suspension between pH 4 and pH 6.5 during such treatment and separating the virus-containing liquid from the flocculum or coagulum and preserving it.

6. The process of purifying a negatively charged virus, comprising treating a solution or suspension containing an exposed virus with a negatively charged aluminum gel to produce a flocculum or coagulum of extraneous material present and leave the virus in the liquid, and separating the liquid from the flocculum or coagulum and preserving it.

7. The process of purifying a negatively charged virus, comprising treating a solution or suspension containing an exposed virus with a negatively charged aluminum gel to produce a flocculum or coagulum of extraneous material present and leave the virus in the liquid, adding acid if and as required to maintain acid the hydrogen ion concentration of the solution or suspension during such treatment, and separating the liquid from the flocculum or coagulum and preserving it.

8. The process of purifying a negatively charged virus, comprising treating a solution or suspension containing an exposed virus with a negatively charged aluminum gel to produce a flocculum or coagulum of extraneous material present and leave the virus in the liquid, adding acid if and as required to maintain the hydrogen ion concentration of the solution or suspension between pH 4 and pH 6.5 during such treatment, and separating the liquid from the flocculum or coagulum and preserving it.

9. The process of purifying a negatively charged virus, comprising breaking down a virus-containing material to reduce it to colloidal or quasi-colloidal size to expose the virus, treating a solution or suspension containing such exposed virus with a negatively charged aluminum gel to produce a flocculum or coagulum of extraneous material present and leave the virus in the liquid, and separating the liquid from the flocculum or coagulum and preserving it.

10. The process of purifying a negatively charged virus, comprising mechanically treating a virus-containing material to reduce such material to colloidal or quasi-colloidal size, treating a solution or suspension containing such colloidal or quasi-colloidal virus-containing material with a negatively charged aluminum gel to produce a flocculum or coagulum of extraneous material present and leave the virus in the liquid, and separating the liquid from the flocculum or coagulum and preserving it.

HENRY R. KRAYBILL.
PEARL H. BREWER.
MAX W. GARDNER.